US008593666B2

(12) United States Patent  (10) Patent No.: US 8,593,666 B2
Xiao  (45) Date of Patent: Nov. 26, 2013

(54) METHOD AND SYSTEM FOR PRINTING A WEB PAGE

(75) Inventor: Jun Xiao, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 851 days.

(21) Appl. No.: 12/369,507

(22) Filed: Feb. 11, 2009

(65) Prior Publication Data

US 2010/0202010 A1    Aug. 12, 2010

(51) Int. Cl.
*G06F 3/12*    (2006.01)

(52) U.S. Cl.
USPC .......... 358/1.15; 358/1.18; 358/1.9; 358/403; 358/452; 358/464; 382/173; 382/176; 382/232; 709/203; 715/202; 715/234; 715/274; 715/764

(58) Field of Classification Search
None
See application file for complete search history.

(56) References Cited

U.S. PATENT DOCUMENTS

| | | | |
|---|---|---|---|
| 7,142,318 B2 | 11/2006 | Lopez et al. | |
| 7,246,041 B2 | 7/2007 | Fukuda et al. | |
| 7,363,279 B2 | 4/2008 | Ma et al. | |
| 2004/0017579 A1 * | 1/2004 | Lim | 358/1.9 |
| 2004/0068698 A1 * | 4/2004 | Wu et al. | 715/525 |
| 2004/0259067 A1 * | 12/2004 | Cody et al. | 434/323 |
| 2005/0175249 A1 * | 8/2005 | Ferlitsch | 382/243 |
| 2006/0290976 A1 * | 12/2006 | Ko et al. | 358/1.15 |
| 2007/0047814 A1 * | 3/2007 | Yamazaki | 382/176 |
| 2007/0273895 A1 | 11/2007 | Cudd et al. | |
| 2008/0177994 A1 * | 7/2008 | Mayer | 713/2 |
| 2010/0014103 A1 * | 1/2010 | Lee et al. | 358/1.9 |

FOREIGN PATENT DOCUMENTS

CN    1916900 A  *  8/2006  ............. G06F 17/30

OTHER PUBLICATIONS

Baldwin et al., PrintMonkey: Giving Users a Grip on Printing the Web, Proc. DocEng 2008, Sep. 16-19, 2008, 10 pages.
Wong et al., Document Analysis System, IBM J. Res. Develop., vol. 26, No. 6, Nov. 1982, 10 pages.
Cai et al., VIPS: a Vision-based Page Segmentation Algorithm, Microsoft Corporation, Nov. 1, 2003, 29 pages.

* cited by examiner

*Primary Examiner* — King Poon
*Assistant Examiner* — David S Cammack (57) ABSTRACT

A method and system for printing a web page include converting the web page content to an image and segmenting the image into a plurality of regions. At least one of the regions is selected, and the selected region is printed.

18 Claims, 7 Drawing Sheets

METHOD AND SYSTEM FOR PRINTING A WEB PAGE

BACKGROUND

The Internet provides information via a conventional World Wide Web (web) browser, which displays the information on a device such as a personal computer, handheld device, or other device connectable to the internet. Users regularly desire a hard copy of the information, but web pages are often ill-formatted for printing. Ink and paper can be wasted on ads, the header and footer, and other parts of the web page that are not the desired content for printing. Web page layouts that may be visually pleasing on video displays can actually waste paper when printed out.

Some web sites offer an alternative printable version of site pages, usually through a CSS (cascading style sheet) file. However, many site owners lack the monetary motivation or technology expertise to provide such alternative printable versions.

Users can copy and paste web page content from a browser to their own webpage or text editing tool in order to print only the desired content. However, this requires inconvenient manual labor and some web pages are formatted in ways that render it difficult to select specific content.

Some attempted web page printing solutions are based on content analysis of web pages, though these also tend to be largely unsatisfactory. For example, it is difficult for an algorithm to determine what a user really wants to print because the answer requires semantic understanding of the page content. The underlying document structure, such as the DOM (document object model) structure, may differ greatly from the visual rendering result due to a variety of reasons such as the CSS and dynamic javascript code. What a user sees as closely related objects on the screen may be far apart from each other in the DOM tree. Accordingly, selecting content of a web page using the browser's default selection tool often results in seemly unrelated content being selected.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following detailed description of the preferred embodiments, reference is made to the accompanying drawings which form a part hereof and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
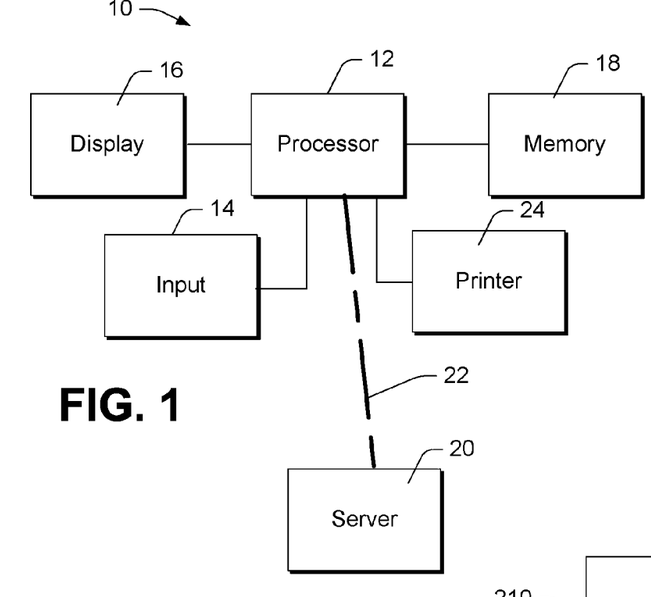
FIG. 1 is a block diagram conceptually illustrating a system for printing a web page in accordance with embodiments of the present invention.

FIG. 1 is a block diagram conceptually illustrating a system 10 for printing a web page in accordance with disclosed embodiments. Embodiments of the disclosed methods and systems typically operate on a computer, such as a typical personal computer system or other device capable of displaying web pages. An example of such a system 10 includes a processor 12, an input device 14 (such as a mouse, keyboard, touch screen, etc.), and a display device 16. A memory 18 is accessible by the processor 12, and stores program instructions that are executed by the processor. The memory 12 collectively refers any of a number of different types of computer memory that may be accessible by the processor 10, such as RAM, ROM, NVRAM, a hard drive, a CD, a DVD, etc.

The system 10 is connected to a server computer 20 via an internet link 22. The memory 18 stores a typical web browser program, which is capable of obtaining web pages from the server 20, and displaying them on the display device 16. The memory 18 further includes instructions for executing embodiments of disclosed web printing methods, which include processing web pages for printing on a printer 24.

It should be appreciated that the illustrated components of the system 10 are examples of some typical components employed in disclosed embodiments, and that the system 10 may have more or fewer components than shown, may combine two or more components, or a may have a different configuration or arrangement of the components. The various components shown in FIG. 1 may be implemented in hardware, software or a combination of both hardware and software, including one or more signal processing and/or application specific integrated circuits.

Figure 2:
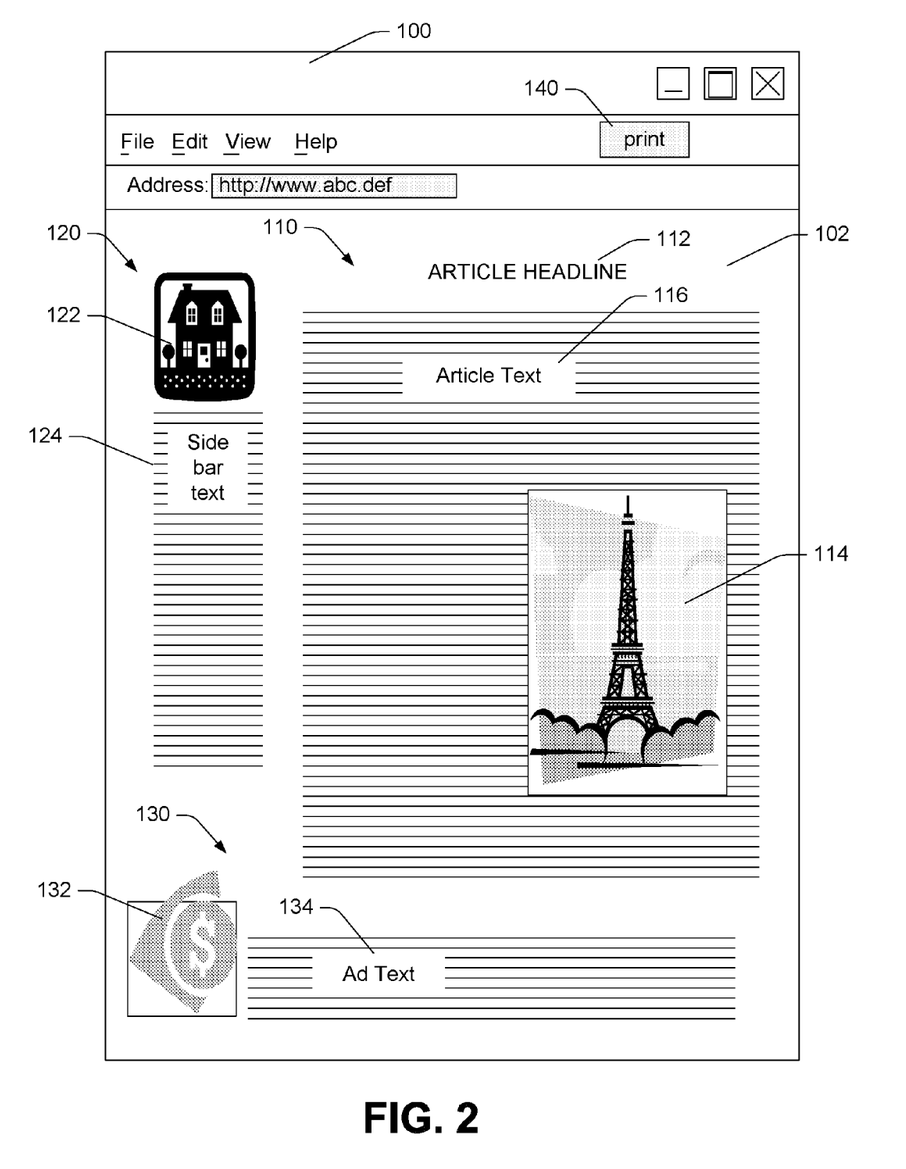
FIG. 2 conceptually illustrates a browser window displaying an example of a typical web page.

FIG. 2 conceptually illustrates a browser window 100 displaying an example of a typical web page 102. The web page 102 includes a main article 110 that has a headline 112, a picture 114 and article text 116. The web page 102 also includes sidebar information 120 with a graphic 122 and sidebar text 124. An advertisement 130 is situated at the bottom of the page 102, and includes a graphic 132 and ad text 134.

If a user simply uses the browser's native print function, the main article 110, the sidebar information 120 and the advertisement 130 would all print, typically over several pages, even if the user only wanted to print the main article 110. Thus, significant amounts of paper and ink would be wasted.

In accordance with certain embodiments, a browser plug-in is installed in the system. For example, program instructions implementing the browser plug-in are stored in the memory 18 and executed by the processor 12. The plug-in provides a print button 140 in the browser window 102 that replaces the default browser print function. In some embodiments, a user activates the plug-in, for example, by clicking the print button 140, and in response, only the portion of the page 102 containing desired information is printed.

Figure 3:
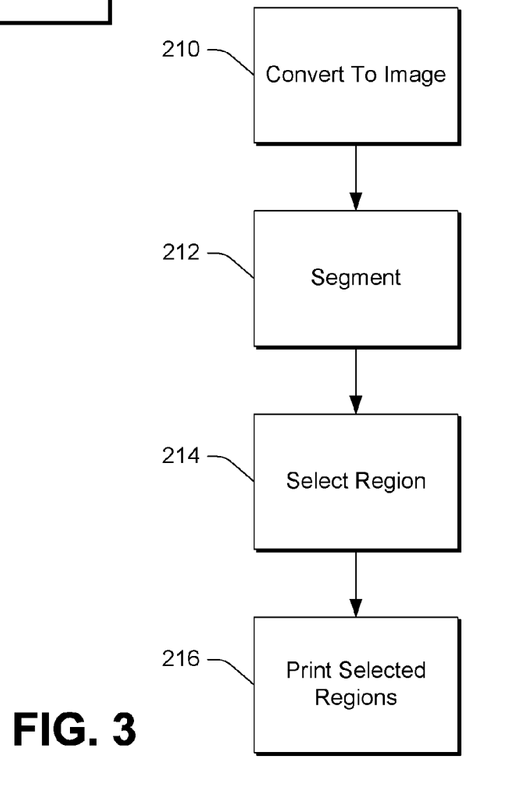
FIG. 3 is a flow diagram generally illustrating a method for printing a web page in accordance with embodiments of the present invention.

FIG. 3 is a flow diagram generally illustrating a method for printing a web page in accordance with disclosed embodiments. In the example described above, upon clicking the print button 140, the web page content is converted to an image in block 210, such as by a typical rasterization process. The image is segmented into a plurality of regions in block 212, and one or more regions are selected for printing in block 214. In block 216, the selected region(s) are printed.

Figure 4:
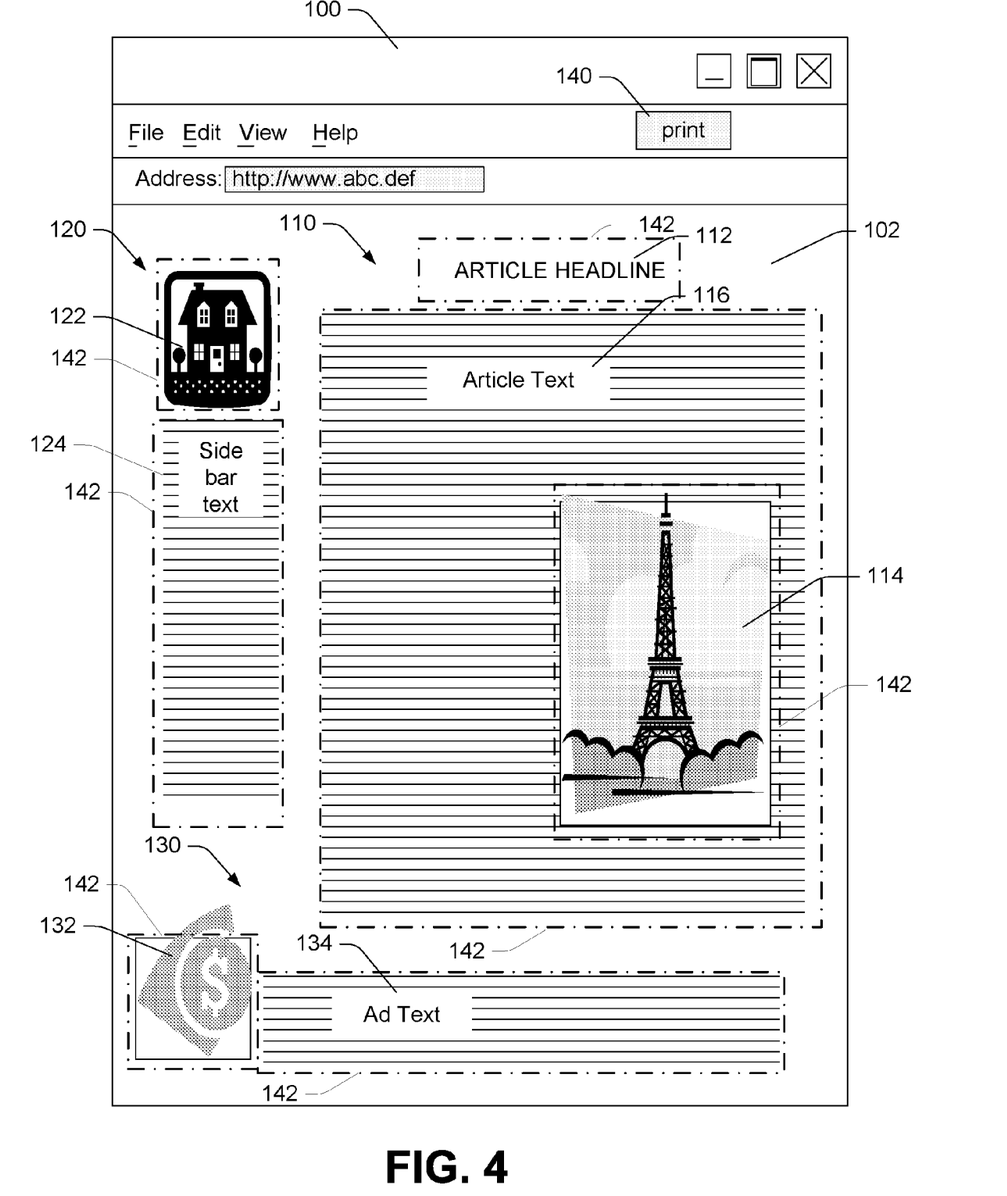
FIG. 4 illustrates the web page of FIG. 2 segmented into regions.

FIG. 4 illustrates the web page content segmented into regions 142. The segmentation process is basically a way to divide the web page 102 into smaller regions. The small regions 142 are then aggregated into larger and semantically homogeneous regions for printing.

In some embodiments, the system automatically selects the initial regions 142 to be printed based on an analysis of a rendered raster image of the web page 102. This approach is advantageous since the image is what users see and it provides an accurate visual description of the web page 102. Further, the image analysis for segmentation results in a bottom-up method for grouping regions, and is not necessarily limited by DOM structure.

Some embodiments of the semantic segmentation process use heuristic rules based on text and visual properties. A complete semantic content segmentation typically cannot be obtained solely from the DOM tree of a HTML web page. In fact, neighboring nodes in the DOM tree may not be semantically or visually related and vice versa.

Figure 5:
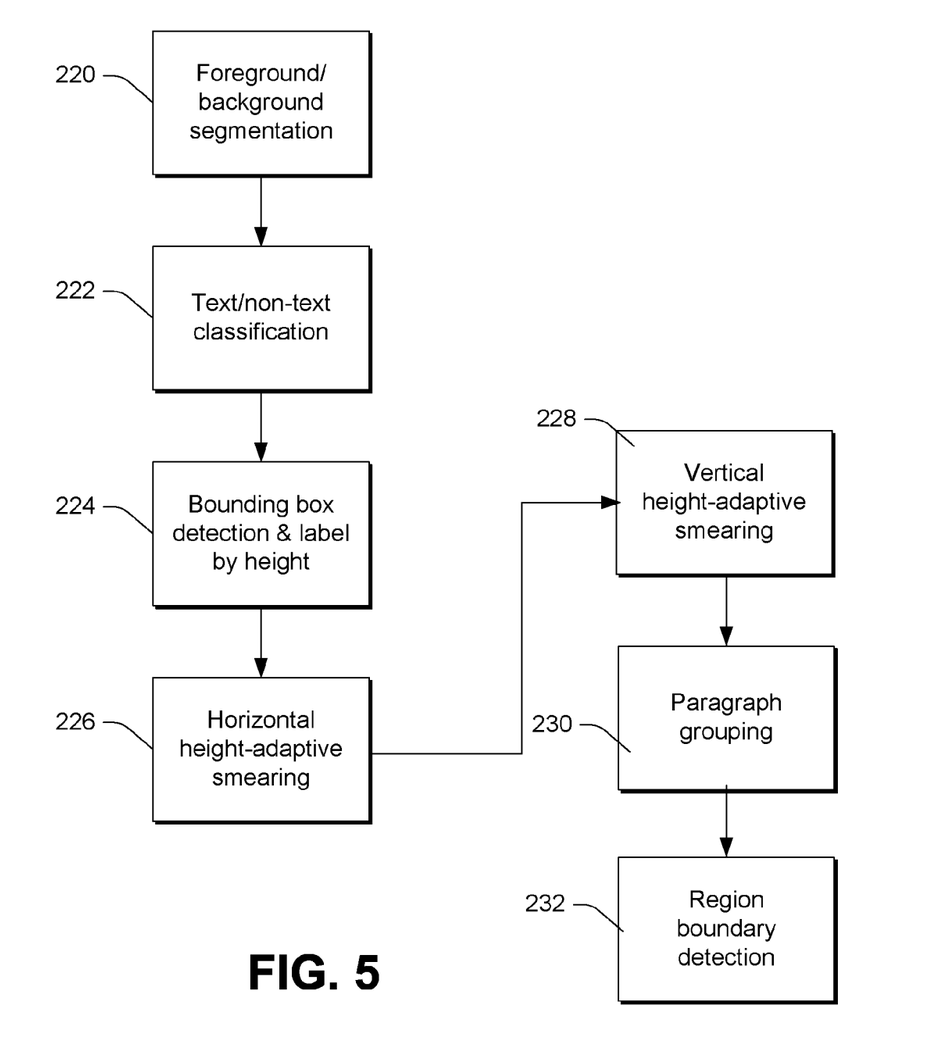
FIG. 5 is a flow diagram generally illustrating a segmentation method in accordance with embodiment of the present invention.

FIG. 5 illustrates a segmentation method employed in some embodiments. In block 220, the image is segmented into foreground and background regions. For example, white can be designated as the background color, and areas that are predominantly white are thus classified as background. In block 222, the foreground regions are classified as text or non-text. In some embodiments, the segmentation process includes applying a smoothing algorithm to the raster image of the web page 102, wherein a bit-map of white and black areas is created representing blocks containing the different types of data such as text and graphics. The smoothing algorithm is applied to a binary sequence in which white pixels are represented by 0's and black pixels by 1's. Neighboring black areas are linked together that are separated by less than some given number pixels, so that the linked areas will be regions of a common data type. For instance, text lines are basically textured black stripes of approximately a constant height length of black runs, so text blocks can be identified based on analyzing these features.

In block 224, bounding box detection and labeling by height occurs, followed by horizontal and vertical height smearing processes in blocks 226 and 228, respectively. By considering the size and shape of the rectangle surrounding the various blocks, text can be grouped into paragraphs in block 230 and the region boundaries detected in block 232. Various factors, such as text size, font, format, etc. are used to group and initially select regions for printing.

Figure 6:
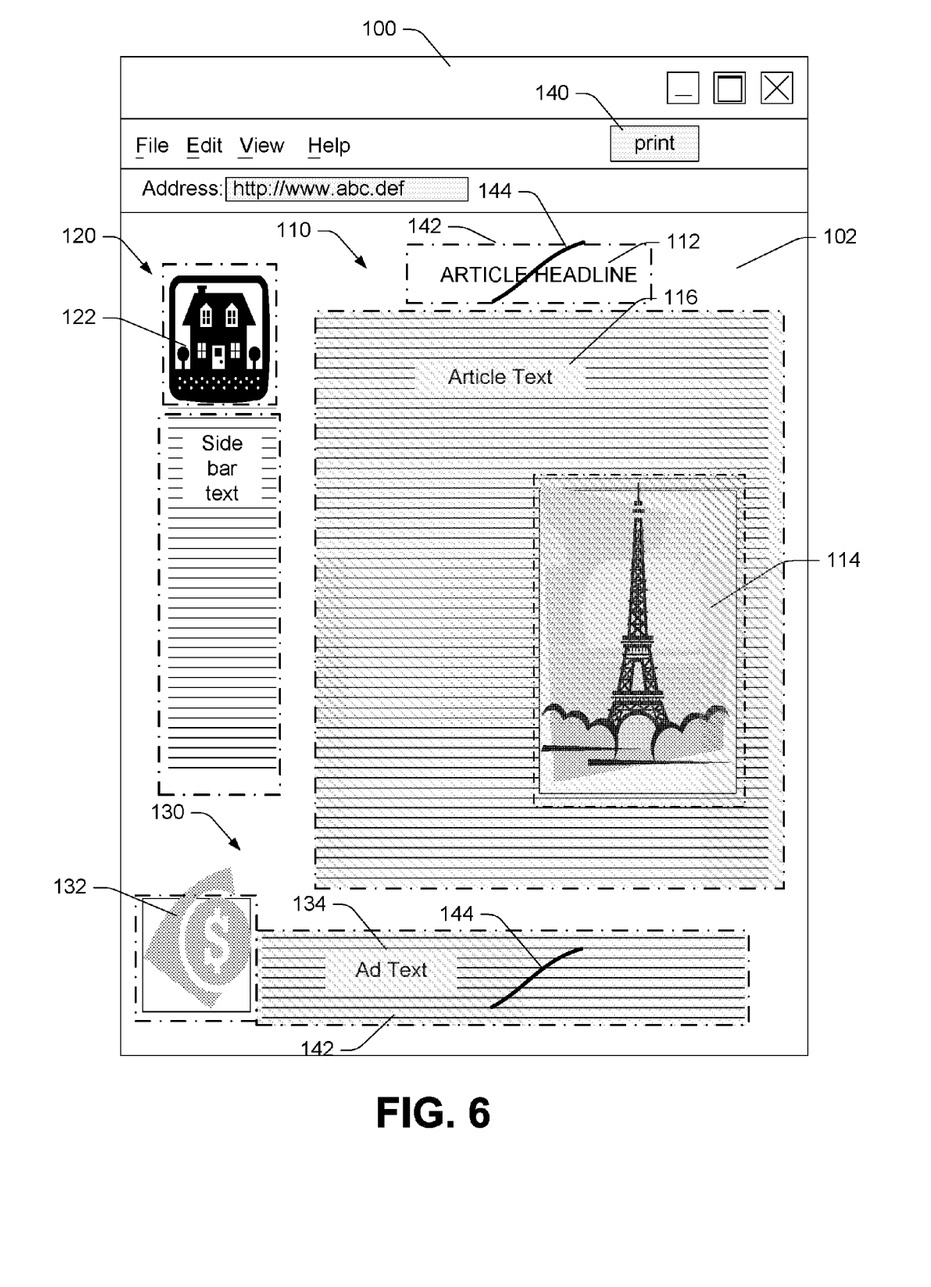
FIG. 6 illustrates regions of the web page of FIG. 4 selected and marked for printing.

FIG. 6 illustrates regions 142 of the web page 102 selected and marked for printing. In FIG. 6, the selection process resulted in selecting regions 142 corresponding to the main article text 116, the main article picture 114 and the ad text 134. Assuming the user wishes to print the entire main article 110, the region 142 for the main article headline 112 should accordingly also be selected, and the ad text 134 should be de-selected.

In some embodiments, the regions 142 for printing can be adjusted by receiving input from a user via the input device 14. For example, to remove a selection, the user can stroke over a region 142 of the marked area using a mouse or touch screen. Similarly, to add a selection, the user can stroke over an unmarked area. FIG. 6 illustrates this process, where a user has made a mark 144 in the selected region 142 corresponding to the article headline 112 to select this region for printing, and another mark 144 in the region 142 for the ad text 134 to de-select this region. Thus, a user can provide input regarding the content desired for printing using simple gestures, rather than precisely drawing a rectangle around desired print areas as is required in some known printing systems.

In other embodiments, one gesture is used to select a region for printing, such as drawing a checkmark in the region, while a second gesture is used deselect a region for printing, such as drawing an "X" in the region. In further embodiments, buttons can be provided in the browser's tool bar to select or deselect regions. For example, "add" and "delete" buttons are provided for corresponding selection and de-selection of print regions.

Figure 7:
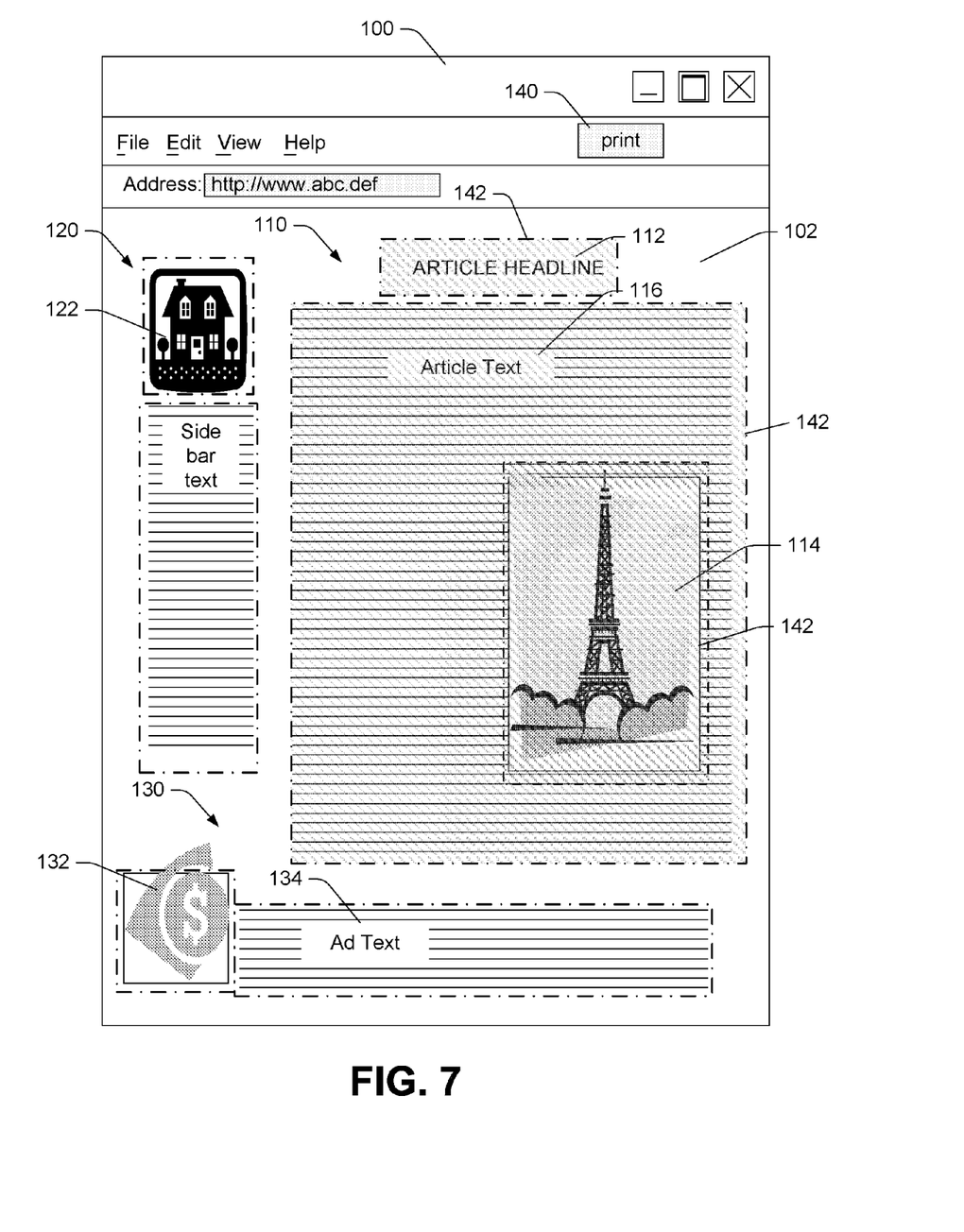
FIG. 7 illustrates the webpage of FIG. 6 after implementing changes indicated by user input.
Figure 8:
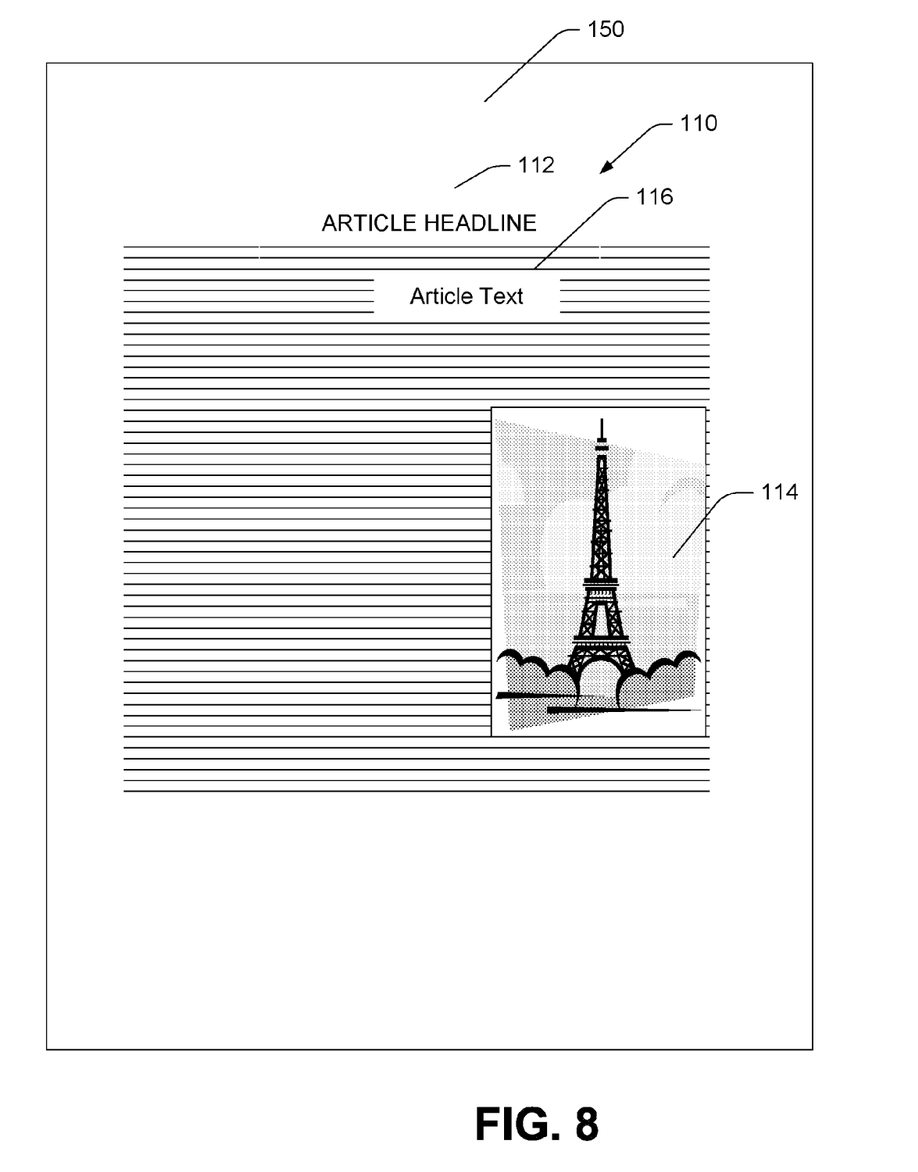
FIG. 8 conceptually illustrates a printed page including the selected web page content.

FIG. 7 illustrates the webpage 102 after implementing the changes indicated by the user input (marks 144) of FIG. 6. Once the user is satisfied with the content to be printed, the selected regions can be printed, for example, in response to clicking the print icon 140 again. FIG. 8 conceptually illustrates a printed page 150 including the selected content—the main article 110 of the web page 102.

In some embodiments, the selected regions 142 for the particular web page 102 are saved as a template for that page. Referring back to FIG. 1, the template could be saved in the memory 18, or on the server 20. By saving the template on the server 20, future prints of the web page 102 by other users having the disclosed print plug-in can use the template instead of relying on the selection process disclosed herein. Of course, future users of the templates can adjust the selected regions 142 on the template using the user inputs described herein to modify the print template, resulting in additional templates for the web page 102.

Moreover, these templates can effectively be shared among various users. For example, where multiple print templates for a given web page 102 are stored on the server 20, the most popular template among all users can be set as the default template for the particular website or page.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for printing, comprising:
   rendering an underlying document structure of a web page to display the web page including a plurality of first regions having the underlying document structure;
   rendering the displayed web page to create a rasterized image of the displayed web page first regions;
   analyzing the rasterized image;
   segmenting the rasterized image into a plurality of selectable second regions based on the analysis of the rasterized image to create a segmented version of the displayed web page that includes more than one of the plurality of selectable second regions on a printable page;

displaying the segmented version of the displayed web page including the printable page;

indicating the plurality of selectable second regions;

selecting at least one of the plurality of selectable second regions; and printing the selected at least one of the plurality of selectable second regions, wherein segmenting the rasterized image into the plurality of selectable second regions includes:

segmenting the rasterized image into selectable foreground regions and background regions; and     segmenting the selectable foreground regions into text regions and non-text regions.

2. The method of claim 1, wherein segmenting the rasterized image into the plurality of selectable second regions includes analyzing the text regions.

3. The method of claim 1, wherein selecting at least one of the plurality of selectable second regions includes receiving input from a user.

4. The method of claim 3, wherein the user input includes marking one of the selected at least one of the plurality of selectable second regions to deselect the region.

5. The method of claim 3, wherein the user input includes marking an unselected one of the plurality of selectable second regions to select the region.

6. The method of claim 3, wherein the user input includes marking a first mark to select one of the plurality of selectable second regions and a second mark to deselect one of the selected at least one of the plurality of selectable second regions.

7. The method of claim 1, further comprising deriving a print template for the web page based on the at least one of the plurality of selectable second regions.

8. The method of claim 7, further comprising saving the print template to a server.

9. The method of claim 1, wherein segmenting the rasterized image into the plurality of selectable second regions includes applying a smoothing algorithm to the rasterized image.

10. The method of claim 1, wherein selecting at least one of the plurality of selectable second regions comprises:

automatically selecting the at least one of the plurality of selectable second regions; and     manually adjusting the automatically selected at least one of the plurality of selectable second regions to provide the selected at least one of the plurality of selectable second regions.

11. A printing system, comprising:

a display device to display a web page rendered from an underlying document structure, the web page including a plurality of first regions having the underlying document structure;

a processor;

a memory accessible by the processor, the memory storing program instructions that when executed by the processor render the displayed web page content to create a rasterized image of the displayed web page first regions;

analyze the rasterized image;

segment the rasterized image into a plurality of selectable second regions based on the analysis of the rasterized image to create a segmented version of the displayed web page that includes more than one of the plurality of selectable second regions on a printable page;

display the segmented version of the displayed web page including the printable page;

indicate the plurality of selectable second regions;

select at least one of the plurality of selectable second regions; and a printer configured to print the selected at least one of the plurality of selectable second regions, wherein to segment the rasterized image into the plurality of selectable second regions includes:

segment the rasterized image into selectable foreground regions and background regions; and     segment the selectable foreground regions into text regions and non-text regions.

12. The system of claim 11, further comprising an input device, wherein to select at least one of the plurality of selectable second regions includes receiving input from a user.

13. The system of claim 11, wherein the memory includes programs instructions for deriving a print template for the web page based on the selected at least one of the plurality of selectable second regions.

14. The system of claim 13, further comprising a server connected to the processor, wherein the memory includes program instructions for saving the print template to the server.

15. A non-transitory computer readable storage medium storing instructions that execute a method for printing, comprising:

rendering an underlying document structure of a web page to display the web page including a plurality of first regions having the underlying document structure;

rendering the displayed web page to create a rasterized image of the displayed web page first regions;

analyzing the rasterized image;

segmenting the rasterized image into a plurality of selectable second regions based on the analysis of the rasterized image to create a segmented version of the displayed web page that includes more than one of the plurality of selectable second regions on a printable page;

displaying the segmented version of the displayed web page including the printable page;

indicating the plurality of selectable second region;

selecting at least one of the plurality of selectable second regions; and printing the selected at least one of the plurality of selectable second regions, wherein segmenting the rasterized image into the plurality of selectable second regions includes:

segmenting the rasterized image into selectable foreground regions and background regions; and     segmenting the selectable foreground regions into text regions and non-text regions.

16. The storage medium of claim 15, wherein selecting at least one of the plurality of selectable second regions includes receiving input from a user.

17. The storage medium of claim 15, wherein segmenting the rasterized image into the plurality of selectable second regions includes applying a smoothing algorithm to the rasterized image.

18. The storage medium of claim 15, wherein selecting at least one of the plurality of selectable second regions comprises:

automatically selecting the at least one of the plurality of selectable second regions; and     manually adjusting the automatically selected at least one of the plurality of selectable second regions to provide the selected at least one of the plurality of selectable second regions.

\* \* \* \* \*

UNITED STATES PATENT AND TRADEMARK OFFICE
CERTIFICATE OF CORRECTION

PATENT NO. : 8,593,666 B2  Page 1 of 1
APPLICATION NO. : 12/369507
DATED : November 26, 2013
INVENTOR(S) : Jun Xiao It is certified that error appears in the above-identified patent and that said Letters Patent is hereby corrected as shown below:

In the Claims

In column 6, line 40, in Claim 15, delete "region;" and insert -- regions; --, therefor.

Signed and Sealed this
Twenty-fifth Day of February, 2014

Michelle K. Lee
*Deputy Director of the United States Patent and Trademark Office*